Patented Jan. 12, 1943

2,308,232

UNITED STATES PATENT OFFICE 2,308,232

ISOPROPYLAMINOMETHYL-(3,4-DIOXYPHENYL) CARBINOL

Georg Scheuing and Otto Thomä, Ingelheim-on-the-Rhine, Germany; vested in the Alien Property Custodian No Drawing. Application December 16, 1939, Serial No. 309,652. In Germany January 17, 1939

10 Claims. (Cl. 260—570.6)

This invention relates to isopropylaminomethyl-(3,4-dihydroxyphenyl)carbinol (N-isopropyl-β-dioxyphenyl-β-hydroxyethylamine) and a process for its production.

The new compound is distinguished in that it is much better relieves the bronchospasm than is the case with the preparations usually administered herefor, for instance by injection of adrenaline. The blood pressure increasing effect of this new compound is much less than that of the adrenaline. When administering this new compound the heart works better than at the administering of adrenaline. It is further 8-10 times less poisonous than the adrenaline. It is further remarkable, that the isopropylaminomethyl-(3,4-dihydroxyphenyl)carbinol has a very good effect also when perorally administered, whereas it is known that adrenaline perorally has practically no effect.

The production of the new compound takes place by reaction of 3,4-dihydroxy-w-halogen-acetophenone with isopropylamine solution and reduction of the produced 3,4-dihydroxy-w-isopropylaminoacetophenone to the corresponding oxy compound (carbinol). To the finely powdered 3,4-dihydroxy-w-chlorine acetophenone equal parts of ethylalcohol and isopropylamine may be added and left standing at room temperature.

Especially good yields in isopropylaminomethyl-(3,4-dihydroxyphenyl)carbinol are obtained, if dioxyphenyl halogen methyl ketone is boiled with an excess of isopropylamine in a solvent such as benzene, water, ethylalcohol, methylalcohol, isopropylalcohol, dioxane or others or in mixtures of these solvents under reflux. The yields are then considerably higher than they are if the method of production is employed which is usual for the production of 3,4-dihydroxy-w-methylamino-acetophenone in which 3,4-dihydroxy-w-chlorine acetophenone is treated with an excess of methylamine at usual temperature or slightly heated. If the prior method used in the production of the methyl compound, is applied to the reaction with isopropylamine, 3,4-dihydroxy-chlorineacetophenone mostly unaltered is recovered. For the reaction at least 2 mol isopropylamine are required, but as a rule a large excess is used. Preferably one starts with the chlorine acetophenone compound, but the corresponding bromine compound results in very satisfactory yields.

For the isolation of the 3,4-dihydroxy-w-isopropylamino-acetophenone obtained by the reaction of dihydroxyphenyl halogen methylketone with isopropylamine the intermediate product, which has been obtained, is dissolved in strong or medium strong acids, such as sulphuric acid or tartaric acid, the corresponding salt crystallizing out upon cooling.

The reduction of the ketone to the oxy compound takes place preferably by catalytic hydrogenation. As catalysts all metals effective at low temperatures, especially the metals of the platinum group, are suitable, such as for instance nickel applied on to kieselguhr (about 10%), palladium applied on to carbon (about 1%), and platinum as platinum black or as platinum oxide. The hydrogenation can be carried out in water, methylalcohol, aqueous alcohol, diluted acetic acid, and the like. If palladium is used as catalyst the working can be carried out at room temperature, whereas when platinum is used generally with heating to about 40°. When nickel is used it is advisable to work at about 80°.

In the following the process according to the invention will be particularly explained by an example without any limitation of the invention to the quantity relations, working temperatures and the like employed being intended.

Example 100 grs. 3,4-dihydroxy-w-chlorine acetophenone, 200 ccm. ethylalcohol and 200 ccm. of about 50% aqueous isopropylamine solution are boiled during three hours on the water bath with the use of a reflux condenser, whereupon neutralizing with diluted sulphuric acid is carried out and the sulphate, obtained upon cooling, from alcohol of 50% is recrystallized; its melting point is 245° C.

21 grs. 3,4-dihydroxy-w-isopropylaminoacetophenone sulphate are hydrogenated with 50 ccm. methylalcohol and 50 ccm. water, 0.5 gr. carbon and 3 ccm. palladium chlorine solution of 2%. After two hours the hydrogen absorption comes to a standstill, after the theoretical quantity of hydrogen has been absorbed. After concentrating the isopropylaminomethyl-(3,4-dihydroxyphenyl)carbinolsulphate crystallizes out. It has a melting point of 180° after refining.

We claim:

1. Isopropylaminomethyl (3,4-dihydroxyphenyl) carbinol, said compound having the property of relieving the spasm of the bronchial muscles.

2. Isopropylaminomethyl (3,4-dihydroxyphenyl) carbinol sulphate, said compound having the property of relieving the spasm of the bronchial muscles.

3. Compounds having the following formula: isopropyl-X-methyl (3,4-dihydroxyphenyl) carbinol, wherein X is a radical taken from the class consisting of NH and HN· strong acid.

4. Process for the production of isopropylamino-methyl(3,4-dihydroxyphenyl)carbinol, consisting in the reaction of 3,4-dihydroxy-w-halogenacetophenone with isopropylamine and reduction of the 3,4-dihydroxy-w-isopropylaminoacetophenone.

5. Process for the production of isopropylamino-methyl(3,4-dihydroxyphenyl)carbinol, consisting in the reaction of 3,4-dihydroxy-w-halogenacetophenone with an excess of isopropylamine in a solvent for said phenone, in the neutralization with acids which are at least moderately strong of the intermediary product obtained, and in the catalytic hydrogenation of the 3,4-dihydroxy-w-isopropylamino-acetophenone.

6. Process as specified in claim 5 in which the reaction of the 3,4-dihydroxy-w-halogen acetophenone with the isopropylamine in excess is carried out in presence of organic solvents under boiling on the reflux.

7. Process as specified in claim 5, in which at least 2 mol isopropylamine are employed.

8. Process as specified in claim 5, in which the catalytic hydrogenation of the 3,4-dihydroxy-w-isopropylamino-acetophenone is carried out with catalysts of the platinum group.

9. Process as specified in claim 5, in which the catalytic hydrogenation of the 3,4-dihydroxy-w-isopropylamino-acetophenone is carried out with nickel.

10. Process for the production of isopropylamino-methyl(3,4-dihydroxyphenyl)carbinol, consisting in the reaction of 3,4-dihydroxy-w-chlorine acetophenone with at least 2 mol isopropylamine in presence of an organic solvent for said phenone under boiling on the reflux, in the neutralization with acids which are at least moderately strong of the intermediary product obtained, and in the catalytic hydrogenation of the same.

GEORG SCHEUING.
OTTO THOMÄ.